April 12, 1949.  B. W. BARLOW  2,467,108
VARIABLE SPEED GEAR

Filed Nov. 29, 1946  5 Sheets-Sheet 1

Inventor
BENJAMIN WILLIAM BARLOW
By
Emery, Holcombe & Blair
Attorney

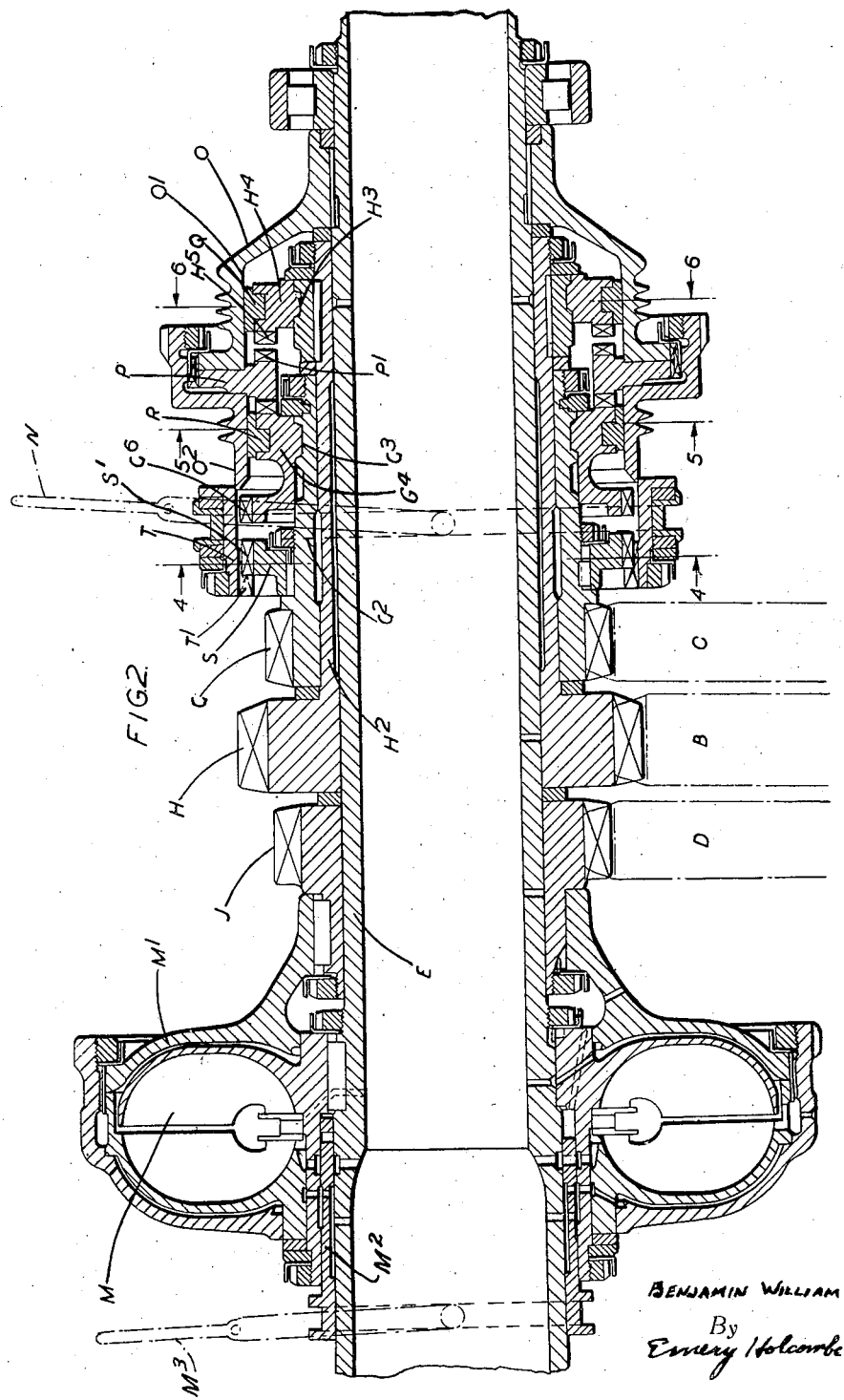

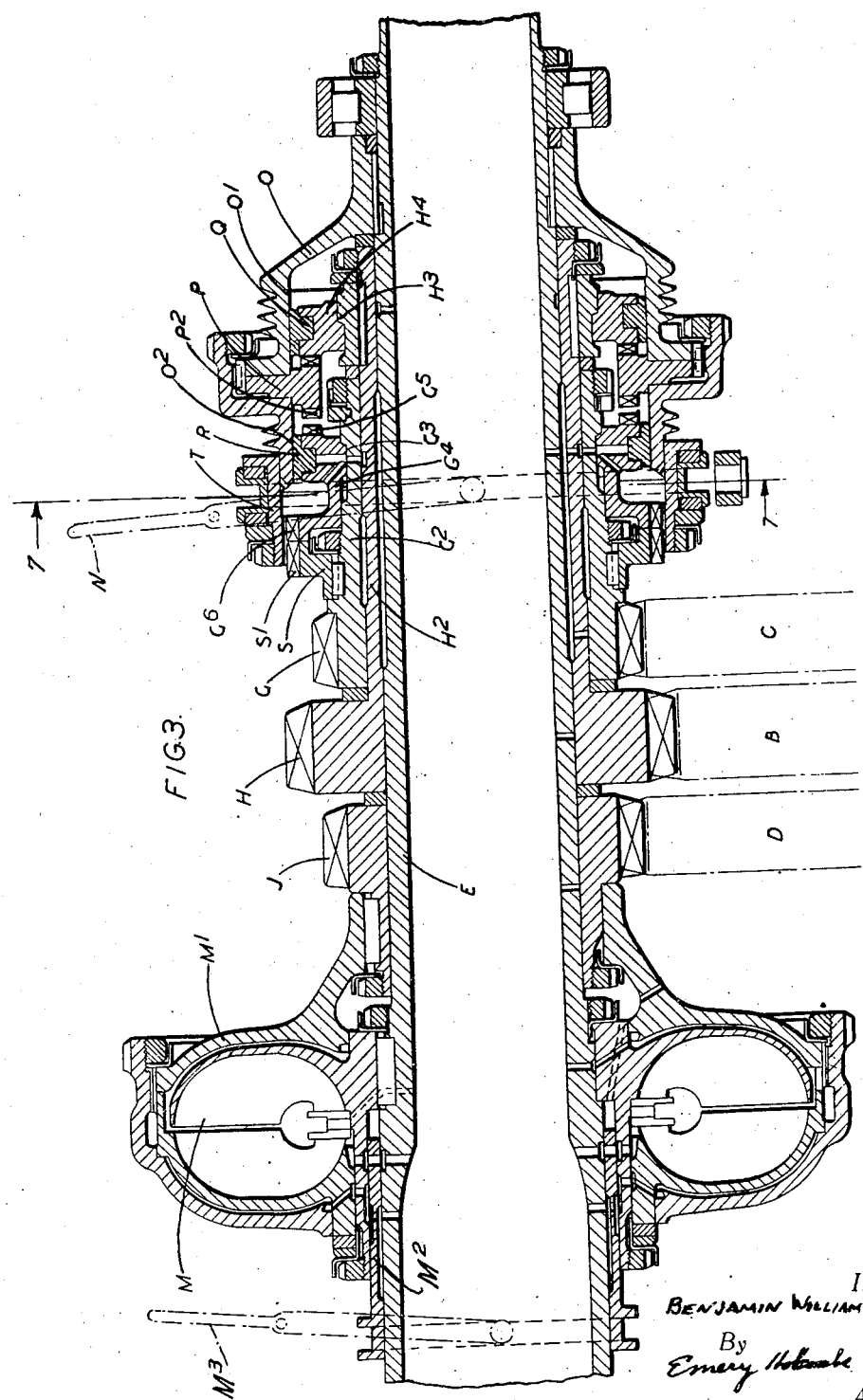

April 12, 1949.   B. W. BARLOW   2,467,108
VARIABLE SPEED GEAR

Filed Nov. 29, 1946   5 Sheets-Sheet 4

Inventor
BENJAMIN WILLIAM BARLOW
By
Emery, Holcombe & Blair
Attorney

April 12, 1949.  B. W. BARLOW  2,467,108
VARIABLE SPEED GEAR
Filed Nov. 29, 1946  5 Sheets-Sheet 5
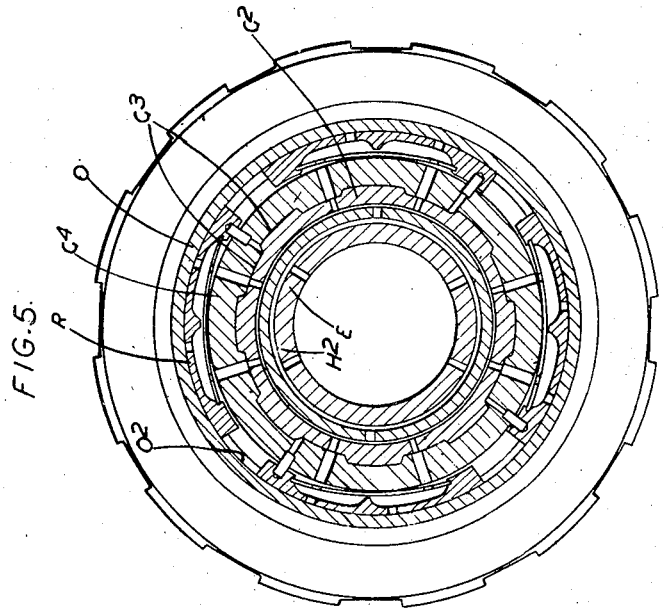
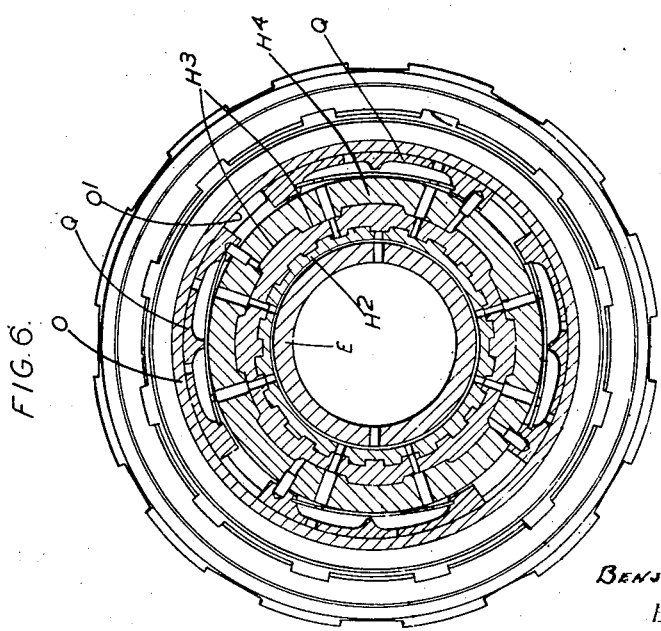
Inventor
BENJAMIN WILLIAM BARLOW
By
Emery Holcombe & Blair
Attorney

UNITED STATES PATENT OFFICE 2,467,108

VARIABLE-SPEED GEAR

Benjamin William Barlow, London, England, assignor to D. Napier & Son Limited, London, England, a company of Great Britain Application November 29, 1946, Serial No. 712,803
In Great Britain October 29, 1945

Section 1, Public Law 690, August 8, 1946
Patent expires October 29, 1965

7 Claims. (Cl. 74—665)

This invention relates to variable speed gears of the type in which gear wheels fast on a driving shaft are in constant mesh with gear wheels which are loose on a driven shaft to which these wheels can be selectively connected by clutches and has for its object to provide improved means for controlling these gear selecting clutches and effecting a change in the transmission speed. While the invention is applicable to speed gears of this type as employed for various purposes it is more especially intended for use with variable speed gearing by which the impeller of a supercharging compressor is driven.

According to this invention the disengagement of one gear selecting clutch and the engagement of another gear selecting clutch for the purpose of altering the gear ratio in the transmission to the driven shaft is effected by causing the driven shaft to rotate at a speed in excess of that at which it can be driven at the higher gear ratio and through the clutch which brings that gear into operation. The engagement and disengagement of a clutch is effected by causing relative rotation between one of the members of that clutch and a part on which it is carried. This relative rotation will cause a movement of that clutch member in the axial direction. Means are provided whereby one clutch after it has been disengaged can be so maintained and re-engagement prevented while the drive is transmitted through another clutch and the gear wheels with which it is associated. Relative rotation between one of the members of a clutch and the part on which it is carried, and a change in the gear ratio to be brought about, is effected through a fluid flywheel and a separate set of gear wheels which, when the flywheel is rendered operative, will cause the driven shaft to be rotated at a speed in excess of that at which it can be driven at the higher gear ratio and through the clutch which brings that gear into operation.

The apparatus may be arranged in various ways and the details modified in accordance with the purpose for which the variable speed gear is to be used and it may be employed with gearing constructed for the transmission of two or more different speeds.

The accompanying drawings illustrate by way of example the invention in a construction in which there are two alternative speed ratios such as may be adopted when carrying the invention into practice. In these drawings—

Figure 2 is a longitudinal sectional elevation of a construction embodying the improved variable speed gear and showing the parts as when the higher gear ratio is engaged.

Figure 3 is a similar view showing the parts when the lower gear ratio is engaged.

Figure 5 is a transverse section on the line 5—5 in Figure 2 looking in the direction of the arrows.

Figure 6 is a transverse section on the line 6—6 in Figure 2 looking in the direction of the arrows.

Figure 1:
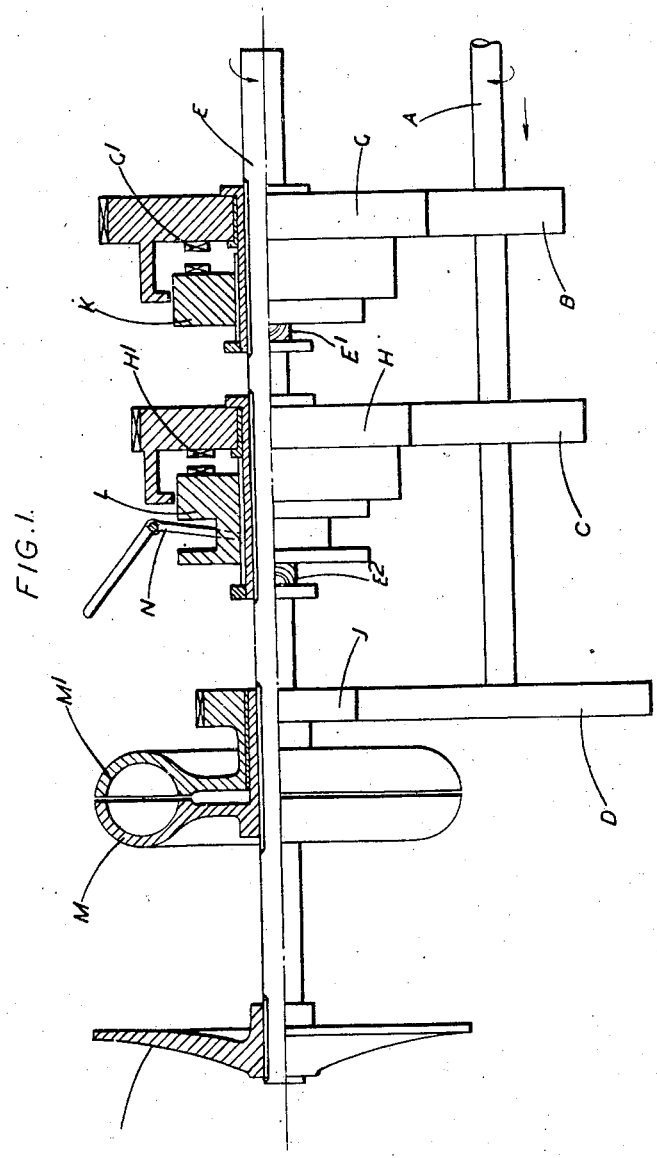
Figure 1 is a diagrammatic view in which the principal features embodied in the improved variable speed gear are indicated.
Figure 7:
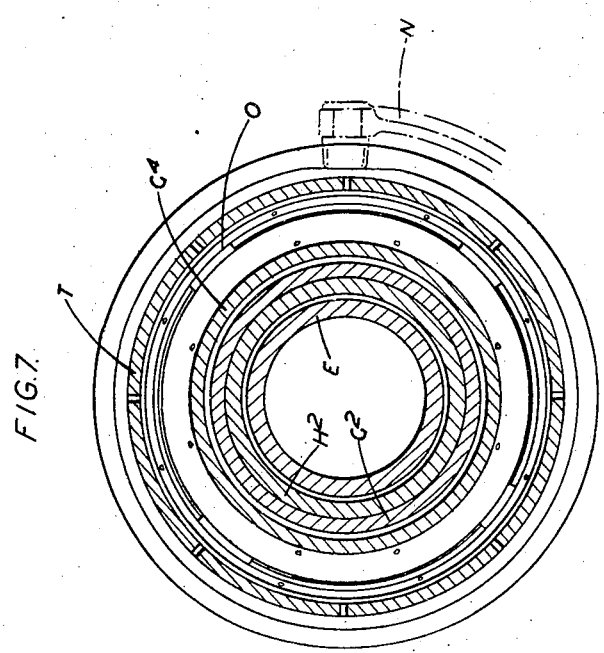
Figure 7 is a transverse section on the line 7—7 in Figure 3 looking in the direction of the arrows.
Figure 4:
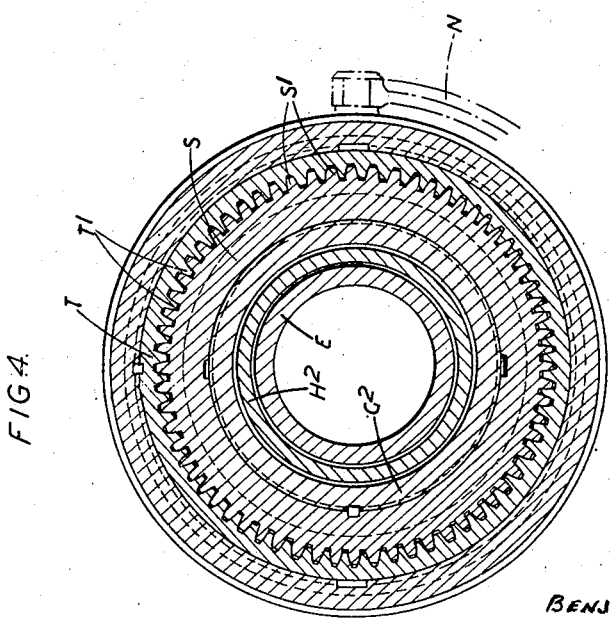
Figure 4 is a transverse section on the line 4—4 in Figure 2 looking in the direction of the arrows.

Referring to the diagrammatic view in Figure 1, this illustrates an arrangement in which there are two speed ratios and the gear is adapted for driving the impeller of a supercharging compressor. In such an apparatus the driving shaft A to which rotation is imparted from a suitable source of power, has fixed thereon three gear wheels of different sizes, namely a small wheel B, an intermediate sized wheel C and a large wheel D. The driven shaft E is parallel to the driving shaft A and has at one end an impeller F. Carried loosely on the shaft E are three gear wheels respectively meshing with the three wheels on the driving shaft, namely a large wheel G meshing with the smallest wheel B on the driving shaft A, an intermediate wheel H meshing with the intermediate wheel C, and a small wheel J meshing with the largest wheel D on the driving shaft. Both the largest wheel G and the intermediate wheel H on the driven shaft E respectively carry clutch members $G^1$ and $H^1$ of suitable form through which each wheel can be coupled to the driven shaft E. The clutch members K and L on the driven shaft which cooperate with the clutch members $G^1$, $H^1$ are connected to the shaft $E^1$ through parts respectively on the shaft and within each clutch member having helical splines or quick-pitch threads, these parts E, $E^2$ with pitches of opposite hand on the shaft being indicated in Figure 1. Thus if one of the clutches is engaged and the shaft E is thereby rotated at the speed determined by the gear set which is then operative, and it is then desired to change this speed, the clutch can be disengaged and the change effected by causing the driven shaft E to rotate temporarily at a greater speed. This will result in the shaft E turning relatively to the clutch member thereon and the lag of the latter due to its inertia will cause this clutch member to move in the axial direction on the shaft owing to the interengaging quick-pitch threads on these parts. In this way either of the clutch members L or K will be withdrawn from its corresponding clutch member $G^1$ or $H^1$ on the wheels G and H. Conveniently the lagging of a clutch member on the shaft E is assisted by providing the loose wheels G and H on their clutch parts $G^1$, $H^1$ with a part which is in frictional contact with the clutch member K or L or some other part connected to the shaft E. By this means a braking effect is exerted on the clutch member and its rotation on the shaft is ensured and thereby the disengagement of the clutch.

The rotation of the driven shaft E at the higher speed necessary to engage a clutch and change the gear ratio is brought about by temporarily driving the shaft E through the third gear set comprising the largest gear wheel D on the driving shaft A and the smallest wheel J on the driven shaft E. This wheel J is then coupled to the shaft E by a fluid flywheel operating as a clutch, one part M of this flywheel being fast on the shaft while the other part $M^1$ is loose thereon and connected to the gear wheel J. While no fluid is in the flywheel the gear wheel J will be loose, but if fluid is admitted to the flywheel the gear wheel J will be coupled to the shaft E which will then be driven at a higher speed than is possible through either of the other two gear sets.

When the lower gear ratio is in operation, that is to say when the wheel G is coupled through the clutch $G^1$, K to the shaft E, it is necessary to hold in its disengaged position the movable member L associated with the higher gear ratio wheels H, C, and this may be effected in various ways as may be convenient. For example a forked lever N engaging the clutch member L may be manually operated so as to hold that member after its disengagement by the action of the helical splines $E^2$ from the loose clutch member $H^1$. When however the gear set H, C of the higher ratio is in operation the speed at which the shaft E will be driven will naturally be greater than the speed at which it could be driven by the lower gear ratio set B, G, and hence the drag exerted on the movable clutch member $G^1$ associated with the lower ratio wheel G will cause that member to be maintained in its disengaged position on the driven shaft.

In the construction shown in Figures 2-7, the several parts of the apparatus function with the same effects as in the arrangement shown diagrammatically in Figure 1, but the gear changes are brought about by a somewhat different disposition and detail construction of the parts which are moved in the axial direction by the interengaging screw threads or helical splines in order to effect the desired engagement and disengagement of the clutch members.

The driven shaft E carries a hollow casing O within which is an annular clutch member P, having on one face dog-teeth $P^1$ and on the opposite face similar teeth $P^2$. Within the casing O, are cylindrical surfaces $O^1$ and $O^2$ adapted to cooperate with frictional members and on clutch members enclosed in the casing whereby these members will be caused to rotate on and also be moved axially relatively to the gear wheels G and H, the axial movement being due to the quick-pitch threads or helical splines.

The gear wheel H is carried at one end of a sleeve $H^2$ rotatable on the shaft E and having at the other end spiral splines or a quick-pitch thread at $H^3$ with which engage a corresponding formation within the clutch member $H^4$ which is provided at one end with the dog-teeth $H^5$ adapted to engage the clutch teeth $P^1$. Between the periphery of the clutch member $H^4$ and the casing surfaces $O^1$ are disposed several circumferentially extending spring actuated friction members Q, the arrangement of which can be seen in Figure 6.

The gear wheel G is mounted at one end of a sleeve $G^2$ which is rotatable on the sleeve $H^2$ and has at the other end spiral splines or a quick-pitch thread at $G^3$ with which engages a similar formation within the clutch member $G^4$. On one end face of this clutch member are teeth $G^5$ adapted to engage the clutch teeth $P^2$ on the member P carried by the shaft casing O, and at the opposite end face of the member $G^4$ are clutch teeth $G^6$. Between the periphery of the clutch member $G^4$ and the surfaces $O^2$ within the casing O are disposed friction members R, the arrangement of which can be seen in Figure 5. It is to be noted that the spiral splines at $G^3$ and $H^3$ are respectively of opposite hand.

The gear wheel J loose on the shaft E is connected to the one part $M^1$ of a fluid clutch of which the other part M is mounted on the shaft E. The flow of fluid into and from this clutch is controlled by suitable means including a sleeve valve $M^2$ so as to enable the shaft E to be driven when desired through the gear wheels D and J at an overspeed whereby the speed changes in the transmission through the shaft E to the impeller driven thereby are brought about.

The clutch teeth $G^6$ on the clutch member $G^4$ serve to connect this member to a ring S provided with teeth $S^1$, this member being keyed to the shaft $G^2$. A sliding sleeve T constituting a locking ring has internal teeth $T^1$ meshing constantly with the teeth $S^1$ of the ring S and adapted also to engage the clutch teeth $G^6$. Thus when the clutch member $G^4$ is caused to move in the axial direction to the left as seen in Figures 2 and 3 and withdraw its teeth $G^5$ from engagement with the clutch teeth $P^2$, the locking ring T is moved axially so as to bring its teeth $T^1$ into engagement with the clutch teeth $G^6$ and thereby connect the clutch member $G^4$ to the ring S which in this way prevents rotation of the clutch member $G^4$ relatively to the sleeve $G^2$ and gear wheel G. The locking ring T is manually moved as by a lever such as N shown in Figure 1 and also in Figures 4 and 7, the two positions of which are indicated in dotted lines in Figs. 2 and 3, respectively.

To obtain the higher gear ratio, the gear wheel G must be coupled to the driven shaft E by engagement of the teeth $G^5$ at one end of the clutch member $G^4$ with the teeth $P^2$ of the shaft clutch member P. To obtain the lower gear ratio, the gear wheel H must be coupled to the driven shaft E by engagement of the teeth $H^5$ of the clutch member $H^4$ with the teeth $P^1$ of the shaft clutch member P.

To bring about the change to the lower speed ratio when the higher gear is in operation, the parts will at first be in the positions in which they are shown in Figure 2, where the shaft clutch member P is coupled through the engaging clutch teeth $P^2G^5$, the member $G^4$, and sleeve $G^2$ to the gear wheel G. The change speed control valve $M^2$ is first actuated by means of the hand lever $M^3$ which causes the hydraulic coupling $MM^1$ to be filled thereby connecting the gear wheel J to the shaft E which is then driven at an over-speed. Since the helical splines at $G^3$ are left-handed, and owing to the action of the friction members R on the surfaces O², assisted preferably by suitable shaping of the dog teeth, the clutch member G⁴ will be caused to rotate in relation to the sleeve G² and it will be thereby moved in the axial direction to the left as seen in Figs. 2 and 3 so as to disengage the clutch teeth G⁵ from the teeth P² of the shaft clutch member. The locking ring T is then moved by any suitable means, such as the lever N, in the axial direction to the right as shown in Fig. 3, and through the engaging teeth T¹G⁶ on the one hand and the engagement of the teeth T¹ with the teeth S¹ of the ring S the clutch member G⁴ is prevented from further rotation relatively to the sleeve G² thereby preventing re-engagement of the clutch teeth G⁵P² when the hydraulic coupling MM¹ is emptied and the speed of the shaft E slows down. As soon as the speed of the shaft E begins to fall below the speed at which the gear wheel H is constantly driven, the clutch member H⁴, carried through right-hand helical splines on the sleeve H², moves to the left along this sleeve owing to the action of the friction members Q on the surface O¹ so that the clutch teeth H⁵ are caused to engage the teeth P¹ of the shaft clutch member with the result that the gear wheel H is coupled to the shaft E. The parts are then in the positions in which they are shown in Figure 3.

To change back to the higher speed ratio, the hydraulic coupling is filled by shifting the valve M² to the left and the gear wheel J thus coupled to the shaft E which is then driven at a speed higher than it can be driven by the higher gear ratio. This causes the clutch member H⁴ to move along the sleeve H² owing to the action of the helical splines and thus the clutch teeth H⁵ are disengaged from the teeth P¹ of the shaft clutch member P. The locking ring T is moved to the left as seen in Figure 2, thus releasing the clutch member G⁴. The hydraulic coupling is now emptied by reversing the position of the valve M² and the shaft E slows down and as its speed falls below that at which the gear wheel G is being constantly driven the action of the friction members R on the surfaces O² cause the clutch member G⁴ to turn relatively to the sleeve G² and as a result move along that sleeve and bring the teeth G⁵ into engagement with the teeth P² on the shaft clutch member P, and the parts are then again in the positions in which they are shown in Figure 2.

What I claim as my invention and desire to secure by Letters Patent is:

1. A variable speed gear comprising in combination a driving shaft on which are fast at least three gear wheels of different sizes, one of these gear wheels of largest diameter serving only for driving at an over-speed while the other gear wheels function respectively for driving at different gear ratios, a driven shaft which carries loosely thereon a gear wheel in constant mesh with the said overspeed gear wheel on the driving shaft and at least two other gear wheels respectively in constant mesh with the said wheels on the driving shaft through which the driven shaft can be driven at different determined gear ratios, clutch devices respectively operative to couple selectively to the driven shaft each of the said gear wheels through which the driven shaft will be driven at a determined speed according to the gear ratio, and a clutch device whereby the said over-speed gear wheel can be temporarily coupled to the driven shaft and the latter when driven at the over-speed will cause the disengagement of one of the said clutch devices and the engagement of another of the said clutch devices whereby the driven shaft will be driven at a higher or at a lower speed.

2. A variable speed gear comprising in combination the parts set out in claim 1 and in which each of the devices which is operative to couple to the driven shaft a gear wheel through which the driven shaft is driven at a determined speed comprises a member fixed on the driven shaft and a member which is loose on the driven shaft and connected to a gear wheel which will be coupled to the shaft when the clutch members are engaged, the said loose clutch member being connected to its gear wheel through helical splines operative to effect relative axial movement between the clutch members and thereby bring them into engagement or disengage them.

3. A variable speed gear comprising in combination the parts set out in claim 1 and in which each of the clutch devices which is operative to couple to the driven shaft a gear wheel through which the driven shaft is driven at a determined speed comprises a member fixed on the driven shaft, a sleeve on which is fixed one of the said gear wheels, a clutch member connected to the sleeve through helical splines, and means whereby when the driven shaft is driven at an overspeed the said clutch member will be caused to rotate on its sleeve relative to the gear wheel on that sleeve and such relative rotation will cause the clutch member to engage with or be disengaged from the clutch member fixed on the driven shaft.

4. A variable speed gear comprising in combination the parts as set out in claim 1 and in which when a clutch associated with one of the said gear wheels through which the said shaft is driven at a definite gear ratio is disengaged and another like functioning clutch is engaged, means are provided to prevent a change in the drive and re-engagement of the disengaged clutch member until the driven shaft has attained the overspeed necessary to cause this disengagement and reengagement.

5. A variable speed gear comprising in combination a driving shaft on which are fast at least three gear wheels of different sizes of which one having the largest diameter serves only for driving at an overspeed while the other and main transmission gear wheels function respectively for driving at different determined gear ratios, a driven shaft which carries loosely thereon a gear wheel in constant mesh with the said overspeed gear wheel on the driving shaft, a sleeve freely rotatable on the said driven shaft and having fast thereon a main transmission gear wheel in constant mesh with the first of the said main transmission wheels on the said driving shaft, a clutch member rotatably carried on the sleeve and connected thereto through helical splines so that if the clutch member is caused to rotate relatively to the sleeve it will move in the axial direction on the sleeve and then engage with or be disengaged from another clutch member which is fast on the driven shaft and thus serve to connect the said transmission gear wheel to the driven shaft, members which are frictionally in contact and are carried respectively by the driven shaft and the said clutch member on the sleeve whereby when the driven shaft is driven at an overspeed the frictional contact between these members will cause rotation of the clutch member on its sleeve and its axial movement which will engage or disengage the clutch, a second sleeve freely rotatable on said first sleeve which is rotatable on the driven shaft and having fast thereon a second main transmission gear wheel in constant mesh with the second of the said main transmission gear wheels on the driving shaft, a clutch member rotatably carried on the said second sleeve to which it is connected through helical splines so that if the clutch member is caused to rotate relatively to the sleeve it will move in the axial direction on the sleeve and then engage with or be disengaged from another clutch member which is fast on the driven shaft and thus serve to connect the said second transmission gear wheel to the driven shaft, members which are frictionally in contact and are carried respectively by the driven shaft and the said second clutch member on its sleeve whereby when the driven shaft is driven at an overspeed the frictional contact between these members will cause rotation of the clutch member on its sleeve and its consequent axial movement which will engage or disengage the clutch, means whereby when by driving of the driven shaft at an overspeed one of the said clutch members has been caused to rotate on and move axially along its sleeve it will be coupled to its sleeve and be thereby prevented from movement relatively to its sleeve and thus maintained in the disengaged position, means for controlling this coupling so as to enable the clutch member to be released for the rotational and axial movements necessary to engage the clutch, a clutch whereby the said overspeed gear wheel can be coupled to the driven shaft on which it is carried, and means for controlling this clutch.

6. A variable speed gear comprising in combination the parts as set out in claim 5 and in which the said clutch used to couple the said overspeed gear wheel to the driven shaft is of the fluid flywheel type, with a constant leak-off flow from within the clutch, whereby the clutch can be filled and rendered operative when a change in the gear ratio is required and the driven shaft is to be driven at the overspeed necessary to effect this change, but when the supply of liquid is cut off and the clutch is allowed to empty it will become inoperative after the gear change has been effected.

7. A variable speed gear comprising in combination the parts as set out in claim 5 and in which the said clutch member on the driven shaft is a single member having clutch parts adapted to be respectively engaged by the said first and second clutch members when moved around and along their sleeves, this single member on the driven shaft having two parts with each of which members carried by one of the said clutch members are in frictional contact, so that when the shaft is driven at the overspeed this frictional contact will cause rotation of the clutch member on its sleeve with consequent axial movement on the sleeve.

BENJAMIN WILLIAM BARLOW.

No references cited.